(12) United States Patent
Andrén et al.

(10) Patent No.: US 6,623,166 B2
(45) Date of Patent: Sep. 23, 2003

(54) PRECISION SPINDLE UNIT FOR LOW FRICTION PERFORMANCE

(75) Inventors: Lars Andrén, Sjövik (SE); Folke Östling, Göteborg (SE); Maurice Richard, Thomery (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 10/060,367

(22) Filed: Feb. 1, 2002

(65) Prior Publication Data

US 2002/0114551 A1 Aug. 22, 2002

(30) Foreign Application Priority Data

Feb. 1, 2001 (SE) .............................. 0100317

(51) Int. Cl.$^7$ .................. F16C 19/02; A01K 89/015
(52) U.S. Cl. .................. 384/517; 384/480; 321/322
(58) Field of Search .................. 384/517, 518, 384/563, 480; 242/321, 322

(56) References Cited

U.S. PATENT DOCUMENTS

| | | | | |
|---|---|---|---|---|
| 2,531,610 A | * | 11/1950 | Butzman, Sr. .............. | 242/270 |
| 2,836,473 A | * | 5/1958 | Tydeman .................... | 384/563 |
| 3,726,576 A | * | 4/1973 | Bambrook et al. .......... | 384/563 |
| 3,804,562 A | * | 4/1974 | Hansson .................... | 384/517 |
| 4,363,527 A | * | 12/1982 | Thrasher .................... | 384/502 |
| 5,564,840 A | * | 10/1996 | Jurras, et al. .............. | 384/517 |

* cited by examiner

*Primary Examiner*—Thomas R. Hannon
(74) *Attorney, Agent, or Firm*—Burns, Doane, Swecker & Mathis, LLP

(57) ABSTRACT

A precision spindle unit for low friction performance includes a tubular housing surrounding a shaft, and first and second rolling bearings mounted on the shaft within the housing. The first bearing is axially arrested between the flange of a locking washer fixed to the shaft and a shoulder on the shaft. A second locking washer is fitted to the shaft, and a resilient member is provided between the second locking washer and a side of the inner race ring of the second bearing. The axially inwardly facing side of the outer race ring of the second bearing engages an inwardly projecting shoulder in the housing, with the second bearing being biased between the resilient member and the inwardly projecting shoulder. The locking washers define a slot seal at each axial end of the housing to provide a seal at the outwardly facing sides of the first and second bearings.

20 Claims, 2 Drawing Sheets

PRECISION SPINDLE UNIT FOR LOW FRICTION PERFORMANCE

This application is based on and claims priority under 35 U.S.C. §119 with respect to Swedish Application No. 0100317-7 filed on Feb. 1, 2001, the entire content of which is incorporated herein by reference.

1. Field of the Invention

The present invention refers to a spindle unit. More particularly, the present invention pertains to a low friction performance precision spindle unit incorporated in rotary systems.

2. Background of the Invention

Spindle units can be used in, for example, hobby articles, toys and measuring instruments. Spindle units can also be used, for example, for fishing reels to support the spool of the reel in a manner providing reliable and smooth operation while also being advantageous from the standpoint of noise aspects.

One factor for determining the quality of a fishing reel is the so-called free spool rotation time. This is defined as the time a spool will continue to rotate after it has been subjected to a defined influence. The calculation of the free spool rotation time is accomplished by attaching the reel to a fixture with the spool arranged substantially horizontal. A line of 500 mm length attached to a 20 g lead weight is affixed to the spool via a tape. The line is wound up on the spool and the weight is then dropped. The time is measured from the moment the weight is dropped until the spool has stopped rotating.

In one respect, a need exists for a spindle unit having operational properties that will provide an increased or improved time of free spool rotation to the spool of a fishing reel supported by the spindle unit.

It would also be desirable to provide an improved spindle unit having useful application in other areas where smooth low friction performance is required or desired.

SUMMARY OF THE INVENTION

According to one aspect, the precision spindle unit for low friction performance includes an elongated shaft, a tubular housing surrounding the shaft and having an interior, with the tubular housing having a larger inner diameter than the diameter of the shaft and having a first annular shoulder projecting inwardly from an inner surface of the housing, and a first rolling bearing positioned in the interior of the housing and mounted on the shaft. The first rolling bearing has an inner race ring and an outer race ring, with the inner race ring of the first rolling bearing having a first side and an oppositely located second side, and with the first side of the inner race ring of the first rolling bearing abutting against a shoulder provided on the shaft. A first locking washer is affixed to the shaft with an interference fit and is provided with an axially extending annular flange which engages the second side of the inner race ring of the first rolling bearing so that the first rolling bearing is axially arrested between the shoulder on the shaft and the annular flange on the first locking washer. A second rolling bearing is provided in the interior of the housing and has a loose fit on the shaft. The second rolling bearing includes an inner race ring and an outer race ring, with the inner race ring of the second rolling bearing having a first side facing axially outwardly and an oppositely located second side. A second locking washer is fitted with an interference fit to the shaft, and a resilient member is provided between the second locking washer and the first side of the inner race ring of the second rolling bearing. The outer race ring of the second rolling bearing has an axially inwardly directed side engaging the first annular shoulder that projects inwardly from the inner surface of the housing. The second bearing is biased under influence of the resilient member between the first annular shoulder in the housing and the resilient member. The first and the second locking washers extend radially along at least a portion of the tubular housing at a short distance from respective side faces of the housing that face the first and second locking washers to form a slot seal at each axial side of the housing, whereby each of the first and second rolling bearings at their outwardly facing sides are provided with a seal.

According to another aspect, a precision spindle unit for low friction performance includes a shaft, a tubular housing surrounding the shaft and possessing an inwardly directed first annular shoulder, and first and second rolling bearings positioned in the housing and mounted on the shaft. The first rolling bearing has an inner race ring and an outer race ring, with an axially inwardly facing side of the inner race ring of the first rolling bearing engaging a shoulder on the shaft. A first locking washer is fixed to the shaft and is provided with an axially extending annular flange which engages an axially outwardly facing side of the inner race ring of the first rolling bearing. A second locking washer is also fixed to the shaft. A resilient member is disposed between the second locking washer and the axially outwardly facing side of the inner race ring of the second rolling bearing, with the second bearing being biased between the resilient member and the first annular shoulder in the housing. The first locking washer faces a first side of the housing and is spaced from the first side of the housing by a distance forming a first labyrinth seal, and the second locking washer faces a second side of the housing and is spaced from the second side of the housing by a distance forming a second labyrinth seal.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
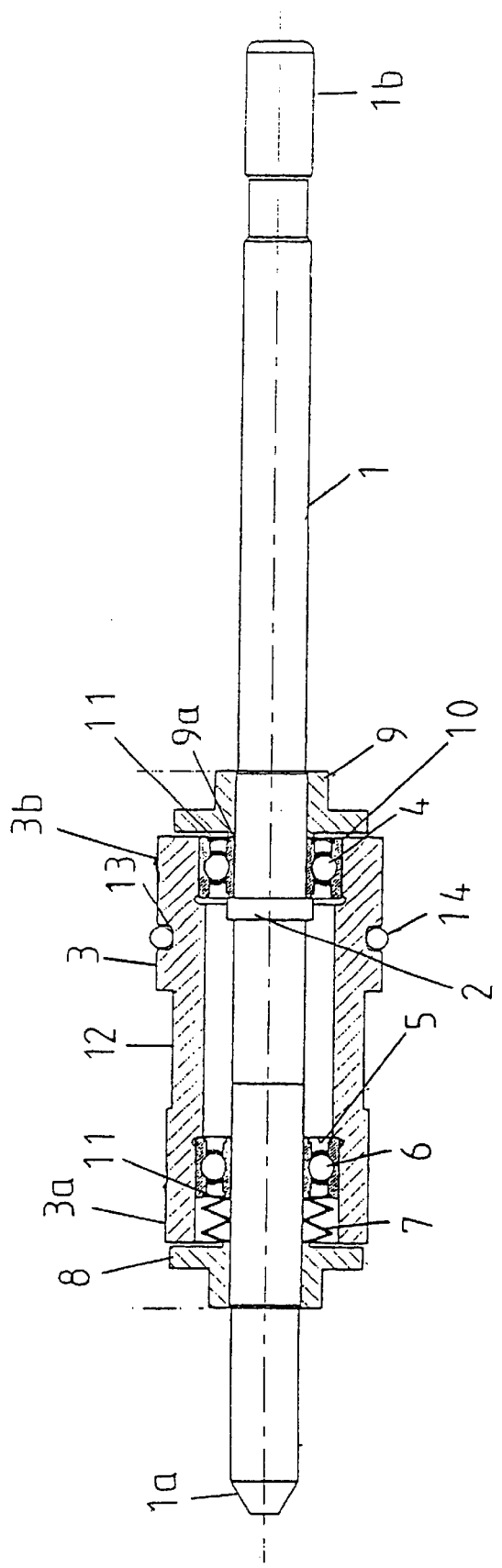
FIG. 1 is a side view, partly in cross-section, of a spindle unit according to the invention.

FIG. 1 illustrates components of a low fiction precision spindle unit according to the present invention. The spindle unit includes an elongated shaft 1 having a first end 1a, a second end 1b and at least one collar 2 positioned between the first and second ends. The collar 2 forms a shoulder on the shaft 1. A tubular, substantially sleeve-shaped bearing housing 3 encloses a portion of the shaft 1 between the first and second ends 1a, 1b of the shaft 1. The bearing housing 3 includes a first end 3a and a second end 3b.

A first rolling bearing 4 is mounted on the shaft 1. The first rolling bearing 4 is preferably a deep groove ball bearing in the illustrated and described embodiment. The first rolling bearing 4 has an inner race ring and an outer race ring. The first rolling bearing 4 is mounted on the shaft 1 so that the inner race ring is in abutting contact against one side face of the collar 2. The outer race ring of the first bearing 4 is mounted with a tight fit in the interior of the bearing housing near the second end 3b of the bearing housing. This first rolling bearing 4 is thus a locating bearing which is not displaceable relative to the bearing housing 3 or relative to the shaft 1, although the inner race ring of the first rolling bearing 4 can be mounted with a loose fit on the shaft 1.

A portion of the bearing housing 3 towards the first end 3a is provided with a cylindrical portion of bigger inner diameter relative to the inner diameter of the adjoining portion of the bearing housing. This portion of enlarged inner diameter ends at a distance from the first end 3a of the bearing housing with a radial shoulder 5 facing towards the first end 3a of the bearing housing.

A second rolling bearing 6 is arranged on the shaft 1 as a free bearing, with a loose fit both on the shaft 1 and in the cylindrical portion of bigger diameter in the bearing housing 3. This second rolling bearing 6 is also preferably a deep groove ball bearing in the illustrated and described embodiment. The second rolling bearing 6 includes an inner race ring and an outer race ring. The outer race ring of the second bearing 6 abuts the shoulder 5 in the bearing housing and is biased against this shoulder 5 by a resilient member 7, such as a spring. The opposite end of the resilient member 7 rests against a locking washer 8 that is firmly arrested to the shaft 1, for example by an interference fit. It is preferable to position the two bearings as far apart in the axial direction as possible to provide a more stiff and stable performance. Thus, as seen in FIG. 1, the axially outwardly facing sides of the inner and outer race rings of the first rolling bearing 4 are substantially flush or aligned with the side of the bearing housing 3 facing the locking washer 9.

The bearing housing 3 is also provided with a locking washer 9 located in the area of the second end 3b of the bearing housing. This locking washer 9 is firmly fitted to the shaft, for example by an interference fit. The locking washer 9 has an annular, axially projecting flange 9a abutting the side face (axially outwardly facing side) of the inner race ring of the first rolling bearing 4 that is located opposite to the collar 2 on the shaft 1. Thus the inner race ring of the first bearing 4 is clamped between the collar 2 on the shaft and the flange 9a. As the second bearing 6 is a free bearing which has its inner race ring biased by the resilient member 7 towards the first bearing 4, the two bearings are arranged in back-to-back arrangement. Thus, axial loads acting in both directions can be accommodated, and a stiff arrangement with the ability to take up tilting moments is obtained.

The locking washers 8 and 9 which are firmly fitted to the shaft 1 extend radially outside the inner bore of the bearing housing 3 and are positioned relative to the end faces of the bearing housing 3 such that a narrow slot 10 is obtained between each end face of the bearing housing and the end face of the respective locking washer which faces the bearing housing end face. The first and second bearings 4, 6 are each provided with built-in seals 11 at the axially outward facing sides of the bearings. In addition, the small slot 10 between each locking washer and the bearing housing provides a further labyrinth seal, which also has an ability during rapid mutual rotation of the shaft and the bearing housing to provide a pumping effect out of the bearing housing rather than a suction effect into the bearing housing. The interior of the bearing housing is thus very well sealed off from the environment.

The low friction performance achieved with the precision spindle as described permits very high rotational speeds as a result of the low losses.

The outer peripheral surface of the bearing housing in the illustrated embodiment is provided with a cental recessed portion 12. In addition, a circumferential groove 13 is provided in the outer peripheral surface of the bearing housing. The circumferential groove 13 is axially spaced from the central recessed portion 12. A resilient, compressible member 14, preferably an O-ring, is positioned in the circumferential groove 13.

The actual design or construction of the outer peripheral surface of the bearing housing 3 is of course to be adapted to the purpose for which the spindle unit is intended. In the illustrated and described embodiment, the spindle unit is primarily intended for supporting a spool of a fishing reel, with the recessed portion 12 in the outer surface of the bearing housing providing shoulders for taking up axial loads in one direction and also defining the position of the spindle unit and its internal bearings in relation to the spool. In addition, the resilient O-ring member 14 provides for radial freedom of play between the bearing housing 3 and the surrounding member, e.g., the fishing reel spool when the spindle unit is used in connection with a fishing reel.

Figure 2:
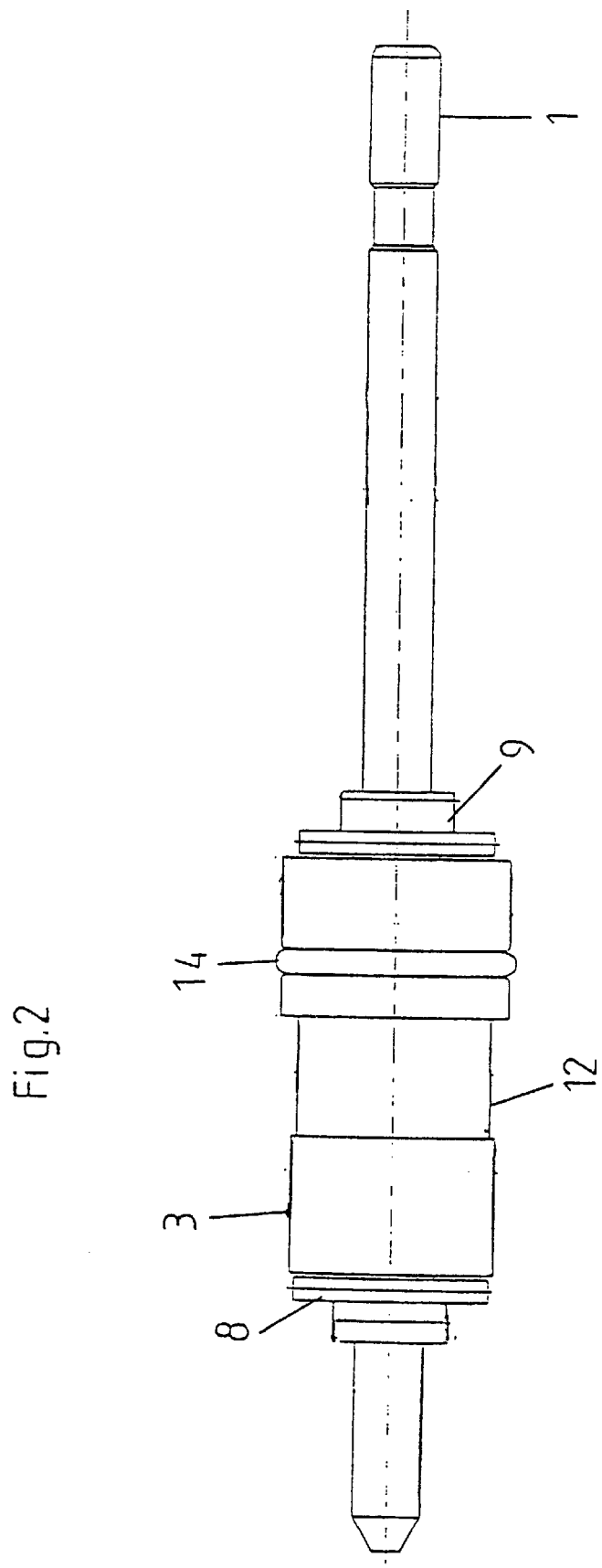
FIG. 2 is a side view of the spindle unit shown in FIG. 1.

FIG. 2 is a side view of the spindle unit corresponding to FIG. 1, but without the cross-sectional illustration. From the FIG. 2 illustration, it can be seen that the outer appearance of the spindle unit in the illustrated and described embodiment is intended for a fishing reel spool. The fishing reel and its associated spool are not illustrated.

In the embodiment described and illustrated, the shaft 1 is preferably a stainless steel shaft, whereas the bearing housing 3 is made from aluminum. Preferably the external surface of the bearing housing is provided with an anodic coating. In addition, the locking washers 8, 9 are preferably made from brass, the O-ring member is preferably a standard O-ring made of rubber, and the resilient member 7 is in the form of a spring preferably made of stainless steel.

The principles, preferred embodiment and manner of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A precision spindle unit for low friction performance comprising:

an elongated shaft;

a tubular housing surrounding the shaft and having an interior, the tubular housing having a larger inner diameter than the diameter of the shaft and having a first annular shoulder projecting inwardly from an inner surface of the housing;

a first rolling bearing positioned in the interior of the housing and mounted on the shaft, the first rolling bearing having an inner race ring and an outer race ring, the inner race ring of the first rolling bearing having a first side and an oppositely located second side, the first side of the inner race ring of the first rolling bearing abutting against a shoulder provided on the shaft;

a first locking washer affixed to the shaft with an interference fit and provided with an axially extending annular flange which engages the second side of the inner race ring of the first rolling bearing so that the first rolling bearing is axially arrested between the shoulder on the shaft and the annular flange on the first locking washer;

a second rolling bearing provided in the interior of the housing and having a loose fit on the shaft, the second rolling bearing having an inner race ring and an outer race ring, the inner race ring of the second rolling bearing having a first side facing axially outwardly and an oppositely located second side;

a second locking washer fitted with an interference fit to the shaft;

a resilient member provided between the second locking washer and the first side of the inner race ring of the second rolling bearing;

the outer race ring of the second rolling bearing having an axially inwardly directed side engaging the first annular shoulder that projects inwardly from the inner surface of the housing;

the second bearing being biased, under influence of the resilient member, between the resilient member and the first annular shoulder in the housing; and the first and the second locking washers being arranged to extend radially along at least a portion of the tubular housing at a short distance from respective end faces of the housing that face the first and second locking washers to form a slot seal at each axial end of the housing, whereby each of the first and second rolling bearings at their outwardly facing sides are provided with a seal.

2. The precision spindle unit according to claim 1, wherein the bearing housing possesses an axial length, the first and second bearings being positioned as far from each other as permitted by the axial length of the bearing housing.

3. The precision spindle unit according to claim 2, wherein the first and second rolling bearings are both deep groove ball bearings, with one of the first and second rolling bearings being a locating bearing and the other of the first and second rolling bearings being a free bearing, with the free bearing being biased towards the locating bearing by the resilient member so that the first and second rolling bearings are positioned in a back-to-back arrangement.

4. The precision spindle unit according to claim 3, wherein the resilient member is a spring of stainless steel arranged around the shaft.

5. The precision spindle unit according to claim 4, wherein the bearing housing is made of aluminum and has an anodic coating on its external surface.

6. The precision spindle unit according to claim 1, wherein the first and second rolling bearings are both deep groove ball bearings, with one of the first and second rolling bearings being a locating bearing and the other of the first and second rolling bearings being a free bearing, with the free bearing being biased towards the locating bearing by the resilient member so that the first and second rolling bearings are positioned in a back-to-back arrangement.

7. The precision spindle unit according to claim 1, wherein the resilient member is a spring of stainless steel arranged around the shaft.

8. The precision spindle unit according to claim 1, wherein the bearing housing is made of aluminum and has an anodic coating on its external surface.

9. A precision spindle unit for low friction performance comprising:

a shaft;

a tubular housing surrounding the shaft, the housing having an inwardly directed first annular shoulder;

a first rolling bearing positioned in the housing and mounted on the shaft, the first rolling bearing having an inner race ring and an outer race ring, an axially inwardly facing side of the inner race ring of the first rolling bearing engaging a shoulder on the shaft;

a first locking washer fixed to the shaft and provided with an axially extending annular flange which engages an axially outwardly facing side of the inner race ring of the first rolling bearing;

a second rolling bearing positioned in the housing and mounted on the shaft, the second rolling bearing having an inner race ring and an outer race ring;

a second locking washer fixed to the shaft;

a resilient member disposed between the second locking washer and an axially outwardly facing side of the inner race ring of the second rolling bearing;

the second bearing being biased between the resilient member and the first annular shoulder in the housing;

the first locking washer facing a first end face of the housing and being spaced from the first end face of the housing by a distance forming a first labyrinth seal; and the second locking washer facing a second end face of the housing and being spaced from the second end face of the housing by a distance forming a second labyrinth seal.

10. The precision spindle unit according to claim 9, wherein the first bearing is located so that the axially outwardly facing side of the inner race ring of the first bearing is substantially aligned with the first end face of the housing.

11. The precision spindle unit according to claim 10, wherein the first and second rolling bearings are both deep groove ball bearings.

12. The precision spindle unit according to claim 11, wherein the resilient member is a spring arranged around the shaft.

13. The precision spindle unit according to claim 12, wherein the bearing housing is made of aluminum and has an anodic coating on its external surface.

14. The precision spindle unit according to claim 10, wherein one of the first and second rolling bearings is a locating bearing and the other of the first and second rolling bearings is a free bearing.

15. The precision spindle unit according to claim 9, wherein the first and second rolling bearings are both deep groove ball bearings.

16. The precision spindle unit according to claim 9, wherein the resilient member is a spring arranged around the shaft.

17. The precision spindle unit according to claim 9, wherein the bearing housing has an anodic coating on its external surface.

18. The precision spindle unit according to claim 9, wherein one of the first and second rolling bearings is a locating bearing and the other of the first and second rolling bearings is a free bearing.

19. The precision spindle unit according to claim 9, wherein the bearing housing has an external surface provided with a recessed portion at an axially central region of the bearing housing.

20. The precision spindle unit according to claim 19, wherein the external surface of the housing includes a circumferential groove axially spaced from the recessed portion, and including a resilient, compressible member positioned in the circumferential groove.

* * * * *